US012658833B2

(12) United States Patent 
Sato et al.

(10) Patent No.: US 12,658,833 B2 
(45) Date of Patent: Jun. 16, 2026

(54) MOTOR CONTROL DEVICE AND MOTOR CONTROL METHOD

(71) Applicant: HITACHI ASTEMO, LTD., Hitachinaka (JP)

(72) Inventors: Yasuaki Sato, Hitachinaka (JP); Keisuke Suzuki, Hitachinaka (JP); Katsuhiro Hoshino, Hitachinaka (JP); Hideki Sekiguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 311 days.

(21) Appl. No.: 18/555,569

(22) PCT Filed: Feb. 15, 2022

(86) PCT No.: PCT/JP2022/005905 
§ 371 (c)(1), 
(2) Date: Oct. 16, 2023

(87) PCT Pub. No.: WO2022/224559 
PCT Pub. Date: Oct. 27, 2022

(65) Prior Publication Data 
US 2024/0204705 A1    Jun. 20, 2024

(30) Foreign Application Priority Data 
Apr. 22, 2021    (JP) ................................. 2021-072462

(51) Int. Cl. 
H02P 27/08 (2006.01) 
H02P 21/05 (2006.01) 
(Continued)

(52) U.S. Cl. 
CPC .............. H02P 21/05 (2013.01); H02P 21/14 (2013.01); H02P 27/06 (2013.01)

(58) Field of Classification Search 
CPC .......... H02P 21/05; H02P 21/14; H02P 27/06; H02P 27/08 
See application file for complete search history.

(56) References Cited

U.S. PATENT DOCUMENTS

2011/0132899 A1    6/2011    Shimomugi et al. 
2014/0152205 A1*    6/2014    Nakai .................... H02P 21/22 
                                                                318/400.02

(Continued)

FOREIGN PATENT DOCUMENTS

JP          2013-39033 A          2/2013 
JP          2014-57515 A          3/2014 
WO      WO-2018/002731 A2      1/2018

OTHER PUBLICATIONS

International Search Report with English Translation and Written Opinion dated Apr. 26, 2022 in corresponding International Application No. PCT/JP2022/005905 (8 pages).

*Primary Examiner* — Cortez M Cook 
(74) *Attorney, Agent, or Firm* — Foley & Lardner LLP

(57) ABSTRACT

A motor control device includes: an inverter that supplies an alternating current to a motor mounted on a vehicle; a current detection unit that detects the alternating current; a position detection unit that detects a rotor phase angle of the motor; and an inverter control unit that controls the inverter based on a current value detected by the current detection unit and the rotor phase angle detected by the position detection unit, wherein the inverter control unit, in response to a timing at which vibration of the vehicle is generated, changes a current phase angle of the motor, and makes a cycle of a waveform of a resultant current of the alternating current irregular.

9 Claims, 7 Drawing Sheets

(51) Int. Cl.
  *H02P 21/14*    (2016.01)
  *H02P 27/06*    (2006.01)

(56) References Cited

U.S. PATENT DOCUMENTS

2020/0119678  A1*    4/2020   Hoshino  ................. H02P 27/08
2023/0155533  A1*    5/2023   Hoshino  ........... H02M 7/53871
                                                           318/801

* cited by examiner

MOTOR CONTROL DEVICE AND MOTOR CONTROL METHOD

TECHNICAL FIELD

The present invention relates to a motor control device and a motor control method.

BACKGROUND ART

Even when a motor is driven at a constant torque command value, the pulsation of a torque occurs due to irregularities or fluctuations in parameters that depend on a hardware of the motor. In a case where a motor is mounted on a vehicle, when a resonance point with the pulsation of torque of the motor exists on a drive line that connects the motor, gears, a drive shaft and a tire to each other, the vehicle vibrates in an amplified manner with even a slight pulsation of torque and hence, the vehicle vibrates where a riding comfort of a rider is deteriorated.

Patent Literature 1 discloses a control device where, when a rotating electrical machine is driven at a predetermined torque and a predetermined rotational speed, a current value is made constant and a current phase of a sinusoidal current is changed periodically thus reducing the pulsation of torque.

CITATION LIST

Patent Literature

PTL 1: WO 2018/002731 A

SUMMARY OF INVENTION

Technical Problem

The control device described in Patent Literature 1 controls the motor regardless of timing at which the vibration of the vehicle is generated and hence, and the control device cannot reduce the influence on the vibration of the vehicle.

Solution to Problem

A motor control device according to the present invention is a motor control device that includes: an inverter that supplies an alternating current to a motor mounted on a vehicle; a current detection unit that detects the alternating current; a position detection unit that detects a rotor phase angle of the motor; and an inverter control unit that controls the inverter based on a current value detected by the current detection unit and the rotor phase angle detected by the position detection unit, wherein the inverter control unit, in response to a timing at which vibration of the vehicle is generated, changes a current phase angle of the motor, and makes a cycle of a waveform of a resultant current of the alternating current irregular.

A motor control method according to the present invention is a motor control method used by a motor control device including: an inverter that supplies an alternating current to a motor mounted on a vehicle; a current detection unit that detects the alternating current; a position detection unit that detects a rotor phase angle of the motor; and an inverter control unit that controls the inverter based on a current value detected by the current detection unit and the rotor phase angle detected by the position detection unit, the motor control method including, in response to a timing at which vibration of the vehicle is generated, changing a current phase angle of the motor, and making a cycle of a waveform of a resultant current of the alternating current irregular.

Advantageous Effects of Invention

According to the present invention, by performing a motor control in response to timing at which the vibration of the vehicle is generated, the influence on the vibration of the vehicle can be reduced.

BRIEF DESCRIPTION OF DRAWINGS

FIG. 2 is a detailed block configuration diagram of an inverter control unit.

DESCRIPTION OF EMBODIMENTS

Figure 1:
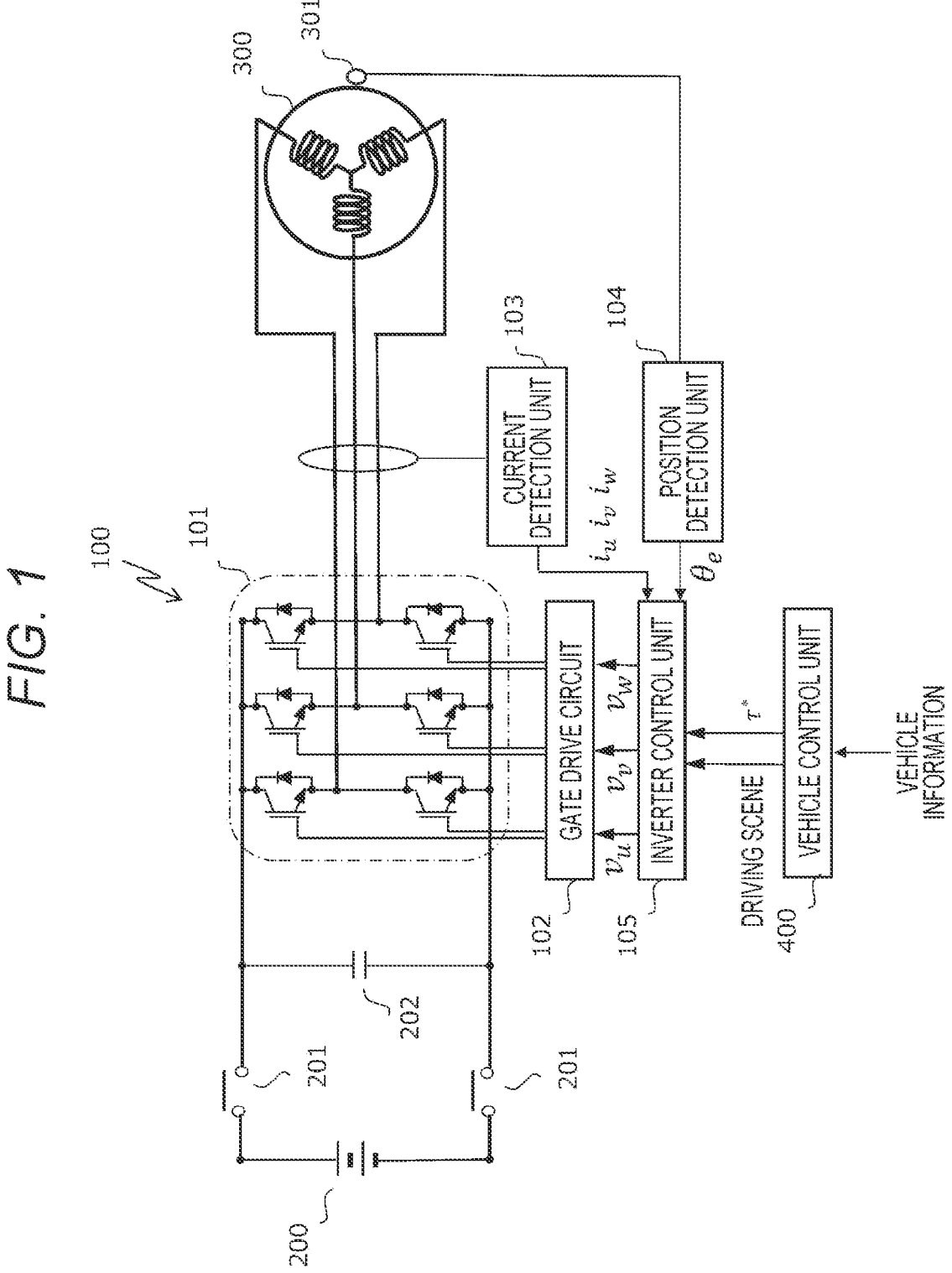
FIG. 1 is a configurational diagram of a system including a motor control device.

FIG. 1 is a configurational diagram of a system including a motor control device 100.

A secondary battery 200 is connected to the motor control device 100 via a contactor 201, and direct current power is supplied to the motor control device 100. A smoothing capacitor 202 is connected between a positive electrode side and a negative electrode side of the supplied direct current power. A three-phase alternating current outputted from the motor control device 100 is supplied to a motor 300 so as to drive the motor 300. The motor 300 will be described with reference to a case where the motor 300 is a three-phase motor.

The motor control device 100, the secondary battery 200, and the motor 300 are mounted on a vehicle such as a hybrid vehicle or an electric vehicle, and drives the vehicle.

The motor control device 100 includes an inverter 101, a gate drive circuit 102, a current detection unit 103, a position detection unit 104, and an inverter control unit 105.

The inverter 101 includes upper and lower arm circuits corresponding to three phases. Each arm circuit includes a power semiconductor element for switching and a diode. The power semiconductor element performs a switching operation in response to a drive signal outputted from the gate drive circuit 102. When a switching operation of the power semiconductor element is performed, the inverter 101 outputs a three-phase alternating current based on direct current power supplied from the secondary battery 200.

The current detection unit 103 detects a three-phase alternating current outputted from the inverter 101 to the motor 300, and outputs current values iu, iv, and iw of the respective phases to the inverter control unit 105.

The position detection unit 104 detects the rotational position of the motor 300 by a resolver 301 or the like, and outputs a rotor phase angle θe to the inverter control unit 105.

The inverter control unit 105 calculates voltage commands Vu, Vv, and Vw of the respective phases based on the current values iu, iv, and iw detected by the current detection unit 103 and the rotor phase angle θe detected by the position detection unit 104, and controls the inverter 101. Although details will be described later, the inverter control unit 105 changes a current phase angle of the motor 300 near a zero cross of a three-phase alternating current corresponding to timing at which the vibration of the vehicle is generated, and makes the cycle of a waveform of a resultant current of the three-phase alternating current irregular thus reducing the influence on the vibration of the vehicle.

A vehicle control unit 400 determines a driving scene of the vehicle based on vehicle information, for example, an acceleration sensor value of the vehicle, a vehicle speed, a degree of opening of an accelerator pedal, a rotational speed of the motor 300, and the like. The driving scene is a driving scene where vibration or noise is generated. For example, the driving scene is a state immediately after the vehicle starts, a state immediately before the vehicle stops, or a state when the vehicle travels on an uphill. The determined driving scene is outputted to the inverter control unit 105. Further, the vehicle control unit 400 outputs a torque command τ* for driving the motor 300 to the inverter control unit 105 based on the vehicle information.

The inverter control unit 105 and the vehicle control unit 400 may be formed of a computer that includes a CPU, a memory, and the like. In this case, the computer performs processing by executing a program stored in a memory or the like. Further, all processing or a part of processing may be implemented by a hard logic circuit. Further, the program may be provided in a state where the program is stored in a storage medium in advance. Alternatively, the program may be provided via a network line. The program may be provided as various forms of computer-readable computer program products, such as data signals (carrier waves).

Figure 2:
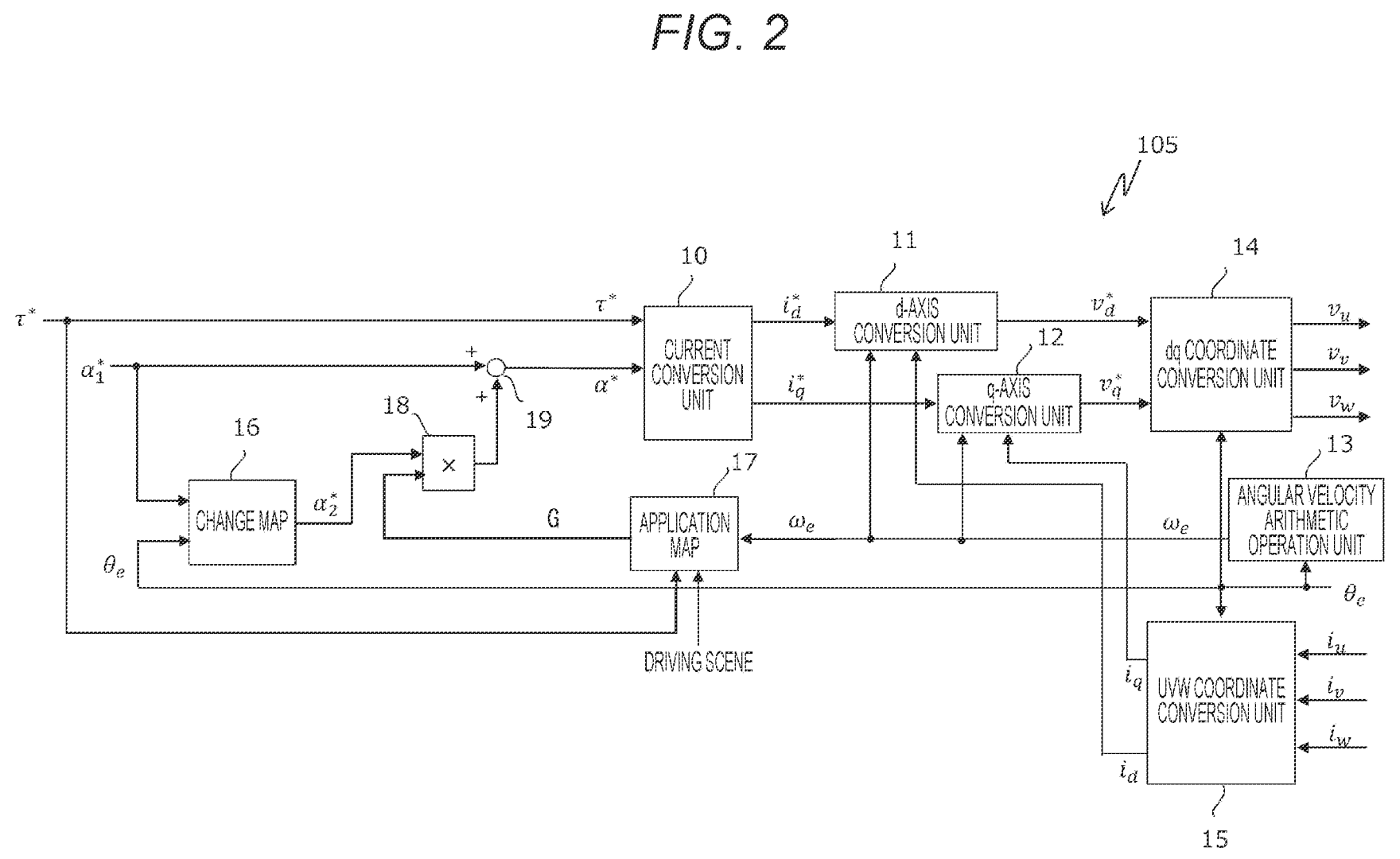

FIG. 2 is a detailed block configuration diagram of the inverter control unit 105.

The inverter control unit 105 includes a current conversion unit 10, a d-axis conversion unit 11, a q-axis conversion unit 12, an angular velocity arithmetic operation unit 13, a dq coordinate conversion unit 14, a UVW coordinate conversion unit 15, a change map 16, an application map 17, a multiplier 18, and an adder 19.

The current conversion unit 10 converts an inputted torque command τ* and a current phase angle final value α* into a d-axis current command value $i_d$* and a q-axis current command value $i_q$* by using the following expressions, that is, the expression (1), the expression (2), and the expression (3).

[Expression (1)]

$$I = \frac{-\dfrac{\varphi_a}{L_d - L_q} \pm \sqrt{\left(\dfrac{\varphi_a}{L_d - L_q}\right)^2 - 4\cos\alpha^* \cdot \sin\alpha^* \left(-\dfrac{\tau^*}{P_n(L_d - L_q)}\right)}}{2\cos\alpha^* \cdot \sin\alpha^*} \quad (1)$$

[Expression (2)]

$$i_q^* = I\cos\alpha^* \quad (2)$$

[Expression (3)]

$$i_d^* = I\sin\alpha^* \quad (3)$$

Here, φa is the number of interlinkage magnetic fluxes, Pn is the number of pole pairs, Ld is the d-axis inductance, and Lq is the q-axis inductance. The current phase angle final value α* is a current phase angle $\alpha_1$* of the motor 300 calculated based on the information from the resolver 301 in a case where the change map 16 described later is not applied. The current phase angle $\alpha_1$* is set to a current phase angle by which an efficient d-axis current command value $i_d$* and an efficient q-axis current command value $i_q$* are acquired in consideration of a weak field.

The d-axis conversion unit 11 converts a d-axis current command value id* into a d-axis voltage command value $v_d$* based on a rotor phase angular velocity ωe obtained by the angular velocity arithmetic operation unit 13 and a d-axis current value $i_d$ obtained by the UVW coordinate conversion unit 15, and the d-axis conversion unit 11 outputs the d-axis voltage command value $v_d$* to the dq coordinate conversion unit 14.

The q-axis conversion unit 12 converts a q-axis current command value $i_q$* into a q-axis voltage command value $v_q$* based on a rotor phase angular velocity ωe obtained by the angular velocity arithmetic operation unit 13 and a q-axis current value $i_q$ obtained by the UVW coordinate conversion unit 15, and the q-axis conversion unit 12 outputs the q-axis voltage command value $v_q$* to the dq coordinate conversion unit 14.

The dq coordinate conversion unit 14 converts the d-axis voltage command value $v_d$* and the q-axis voltage command value $v_q$* into voltage commands Vu, Vv, and Vw of three phases consisting of U, V, and W phases.

The UVW coordinate conversion unit 15 converts current values iu, iv, and iw of three phases consisting of the U, V, and W-phases into a d-axis current value $i_d$ and a q-axis current value $i_q$.

Although the detail will be described later, the change map 16 is a map for changing a current phase angle of the motor near a zero cross of the three-phase alternating current. A current phase angle $\alpha_1$* and a rotor phase angle θe are inputted to the change map 16, and a current phase change value $\alpha_2$* is outputted from the change map 16.

Although the detail will be described later, a rotor phase angular velocity ωe, a driving scene, and a torque command τ* are inputted to the application map 17. The application map 17 determines the timing at which vibration of the vehicle is generated based on these inputted information, and outputs a gain G that indicates the degree of application.

The multiplier 18 multiplies a current phase change value $\alpha_2$* from the change map 16 based on the gain G from the application map 17. The result of the multiplication is added to the current phase angle $\alpha_1$* by the adder 19 so that a current phase angle final value α* is obtained.

In a case where the change map 16 is applied corresponding to the application map 17, the inverter control unit 105 changes a current phase angle $\alpha_1$* of the motor 300 near a zero cross of a three-phase alternating current corresponding to timing at which the vibration of the vehicle is generated without changing a torque command τ*, and makes the cycle of a waveform of a resultant current of a three-phase alternating current irregular. As a result, the influence of the pulsation of a torque of the motor 300 on the vibration of the vehicle is reduced.

Figure 3:
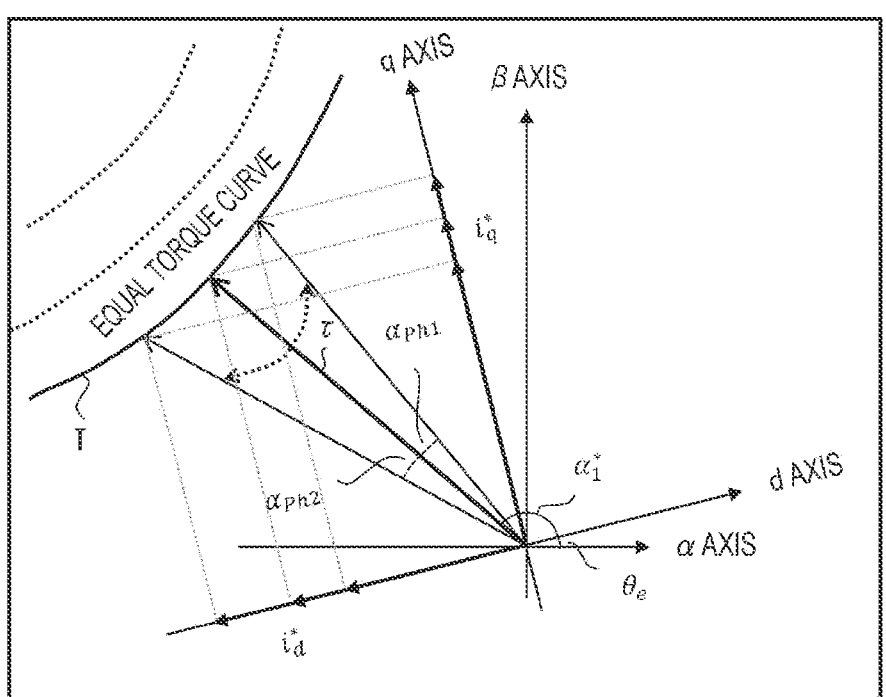
FIG. 3 is a current vector diagram.

FIG. 3 is a current vector diagram.

As illustrated in FIG. 3, an a axis is taken in the horizontal direction, and a 0 axis is taken in the vertical direction. The position shifted from the a axis by a rotor phase angle θe is the d axis, and the position shifted from the d axis by 90 degrees is the q axis.

A torque τ of the motor 300 is expressed by a resultant vector of a d-axis current command value $i_d$* on the d-axis and a q-axis current command value $i_q$* on the q-axis. In the present embodiment, a current phase angle $\alpha_1$* is changed.

The current phase angle $\alpha_1*$ is changed between the minimum value $\alpha_{ph1}*$ and the maximum value $\alpha_{ph2}*$. In this change, the torque $\tau$ of the motor 300 is held on an equal torque curve T where the torque $\tau$ is constant. In other words, the inverter control unit 105 generates a current command values $i_d*$ and $i_q*$ that are equivalent to the torque $\tau$ of the motor 300 before changing of the current phase angle even if the current phase angle is changed. It must be noted that although the increase of the minimum value $\alpha_{ph1}*$ and the maximum value $\alpha_{ph2}*$ of the current phase angle $\alpha_1*$ leads to the suppression of vibration, an energy loss is increased. Accordingly, it is appropriate that the current phase angle $\alpha_1*$ is about 15°, for example. Then, the change of the current phase angle $\alpha_1*$ is performed such that the current phase angle $\alpha_1*$ becomes maximum near a zero cross of a three-phase alternating current. FIG. 3 illustrates a case where a value obtained by adding a rotor phase angle $\theta e$ and a current phase angle $\alpha_1*$ to each other is $5\pi/6$.

Figure 4:
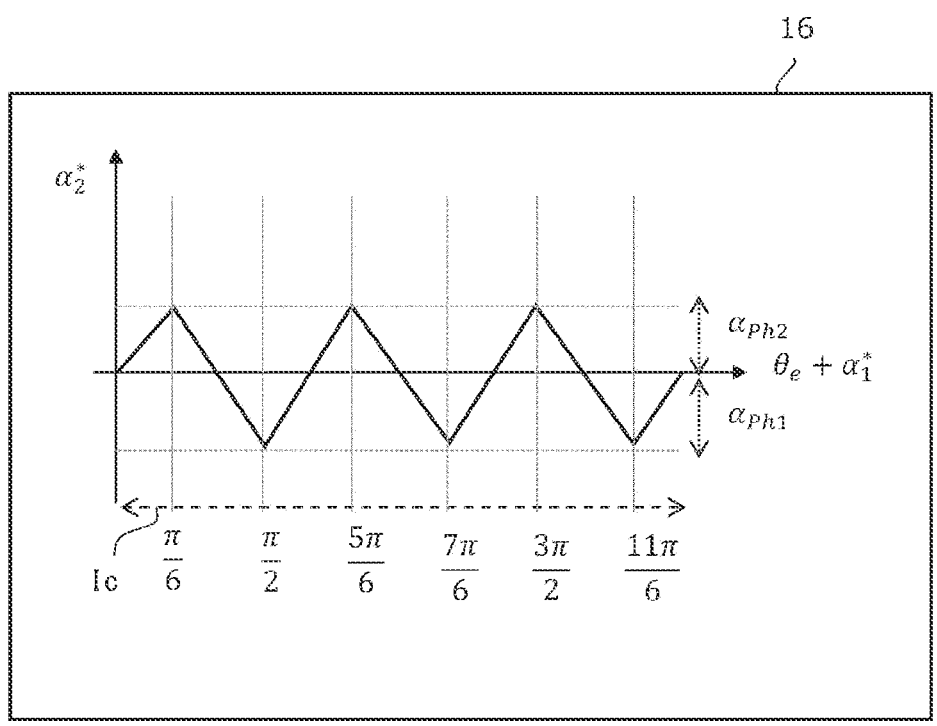
FIG. 4 is a graph illustrating a change map.

FIG. 4 is a graph illustrating the change map 16. An input side (rotor phase angle $\theta e$+current phase angle $\alpha_1*$) is taken on an axis of abscissas, and an output side (current phase change value $\alpha_2*$) is taken on an axis of ordinate. When a value of the rotor phase angle $\theta e$+the current phase angle $\alpha_1*$ is inputted to the input side, the current phase change value $\alpha_2*$ corresponding to the value and illustrated in the graph is outputted.

A current control cycle Ic corresponding to one cycle of an electrical angle of a three-phase alternating current is indicated by a dotted line on an axis of abscissas in FIG. 4. The current control cycle Ic has $\pi/6$, $\pi/2$, $5\pi/6$, $7\pi/6$, $3\pi/2$, and $11\pi/6$ as zero-cross points of the three-phase alternating current. The current phase angle advances to a maximum value $\alpha_{ph2}*$ at the zero-cross points of $\pi/6$, $5\pi/6$, and $3\pi/2$, and a current phase becomes a delay minimum value $\alpha_{ph1}*$ at the zero-cross points $\pi/2$, $7\pi/6$, and $11\pi/6$. By looking up the change map 16, it is possible to obtain a current phase change value $\alpha_2*$ for changing the current phase angle within a range between the minimum value $\alpha_{ph1}*$ and the maximum value $\alpha_{ph2}*$ near the zero cross of the three-phase alternating current. By shifting the current phase angle by advancing or delaying the current phase angle by using the current phase change value $\alpha_2*$ matching with the timing of the vibration of the vehicle, the pulsation of the current (torque) of an electrical angle of the sixth order is suppressed, and the pulsation of the current is diffused to other components. Accordingly, the influence on the vibration of the vehicle can be reduced.

Figure 5:
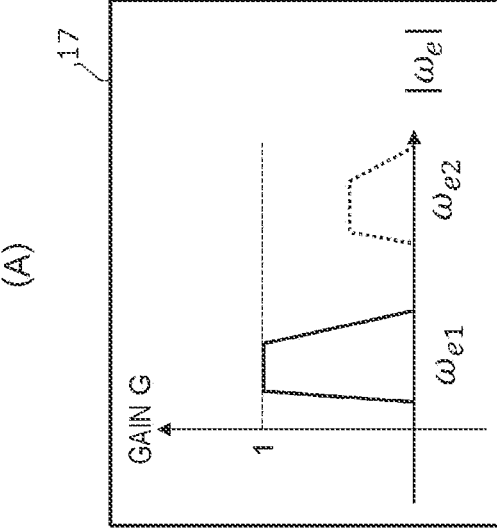
FIG. 5(A), FIG. 5(B), and FIG. 5(C) are graphs illustrating application maps.
Figure 5:
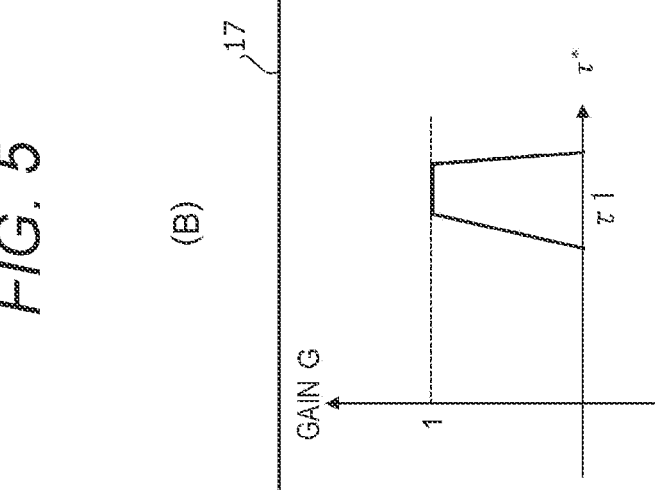
Figure 5:
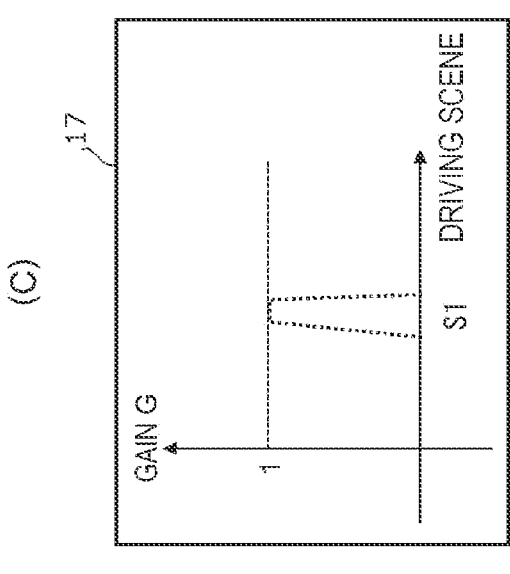

FIG. 5(A), FIG. 5(B), and FIG. 5(C) are graphs illustrating application map 17. Various information are inputted to an input side of an axis of an abscissas, and a gain G indicated on an axis of ordinate is outputted corresponding to the inputted information.

In FIG. 5(A), the input side (rotor phase angular velocity $\omega e$) is taken on the axis of abscissas, and the output side (gain G) is taken on the axis of ordinate. Although FIG. 5(A) is an example, when the rotor phase angular velocity $\omega e$ is $\omega e1$, the gain G is 1, and when the rotor phase angular velocity $\omega e$ is $\omega e2$, the gain G is 0.5. Assume that the relationship between the rotor phase angular velocity $\omega e$ of the motor 300 and the vibration of the vehicle is obtained in advance by an experiment or the like with respect to the vehicle, and is set as the application map 17. Particularly, if a resonance point with the pulsation of a torque of the motor 300 exists on a driveline connecting the motor, gears, a drive shaft, and a tire in a case where the motor 300 is mounted on the vehicle, a rotor phase angular velocity $\omega e$ that corresponds to the resonance point is set to $\omega e1$ as a resonance frequency region of the vehicle. A rotor phase angular velocity $\omega e2$ is set, for example, in a case where there arises a resonance frequency of a sound generated due to a traveling speed of the vehicle.

In FIG. 5(B), the input side (torque command $\tau*$) is taken on the axis of abscissas, and the output side (gain G) is taken on the axis of ordinate. FIG. 5(B) illustrates an example where the gain G is increased when the torque command $\tau*$ is $\tau 1$. Such setting is performed in a case where a resonance point between the vibration of the vehicle and the pulsation of the torque is determined in response to the torque command $\tau*$. In place of the torque command $\tau*$, a two-dimensional map that uses the torque command $\tau*$ and the rotational speed of the motor 300 may be used. Further, the relationship between the rotational speed of the motor 300 and the gain G may be set in the application map 17.

In FIG. 5(C), the input side (driving scene) is taken on the axis of abscissas, and the output side (gain G) is taken on axis of ordinate. FIG. 5(C) illustrates an example where the driving scene is a scene Si that appears immediately after the driving of the vehicle is started and the gain G is increased. The driving scene may be a scene where vibration or noise is generated such as a scene that appears immediately after the vehicle is stopped or a scene where the vehicle travels on an uphill.

In FIG. 5(A), FIG. 5(B), and FIG. 5(C), the description has been made with respect to the example where the application map 17 is determined in advance by an experiment or the like. However, it may be also possible to adopt a control where the vibration of the vehicle is detected when the vehicle travels, and the gain G is increased near the resonance peripheral point of the vehicle. Further, the application map 17 may be set by combining two or more of the rotor phase angular velocity $\omega e$, the torque command $\tau*$, the rotational speed of the motor 300, and the driving scene with each other. Further, without setting the application map 17, two or more of the rotor phase angular velocity $\omega e$, the torque command $\tau*$, the rotational speed of the motor 300, and the driving scene are combined with each other, and the gain G may be increased when a predetermined condition is satisfied. In a case where the motor 300 is operated using a usual control, the application map 17 where the gain G is zero may be selected.

Figure 6:
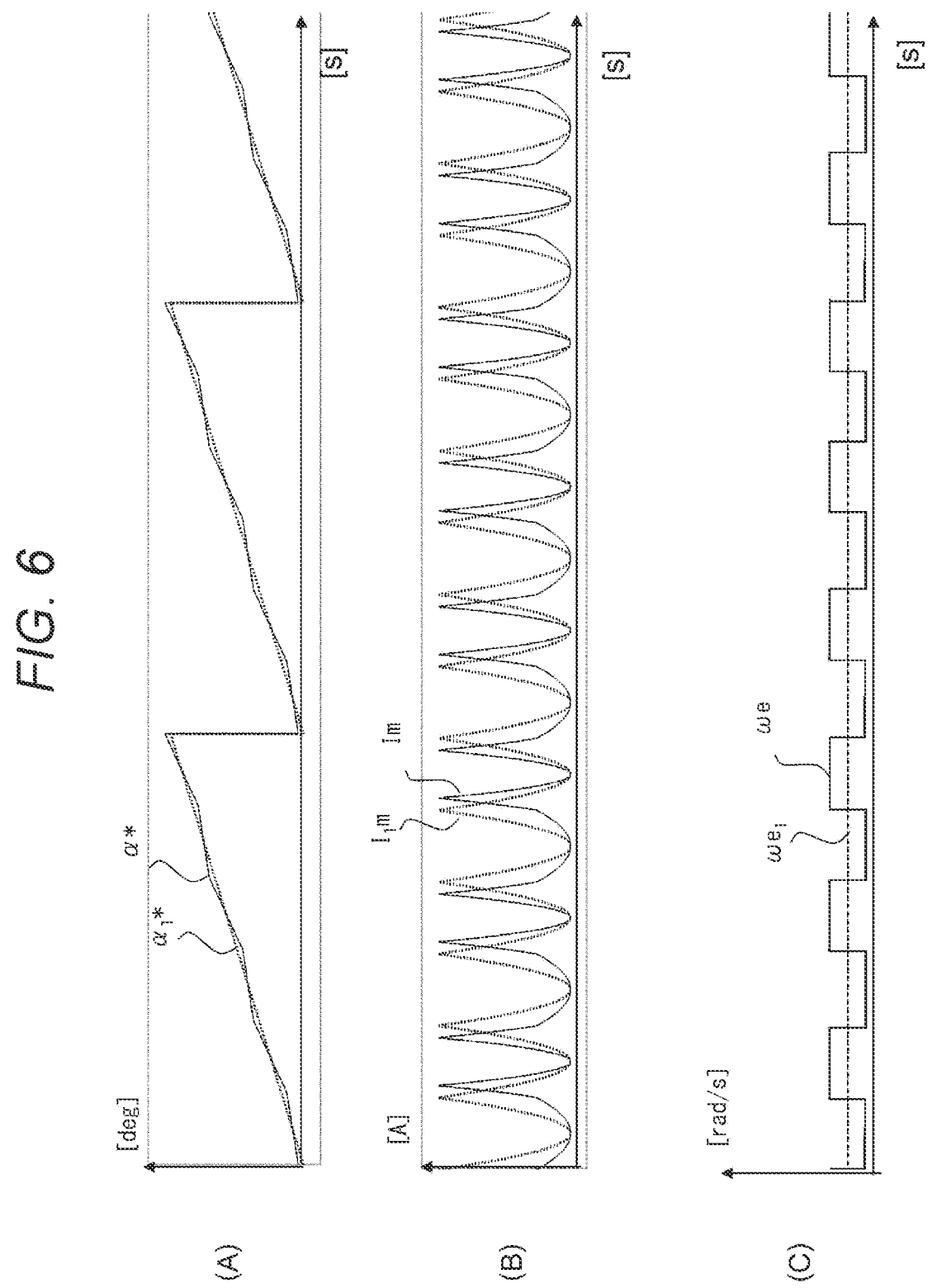
FIG. 6(A), FIG. 6(B), and FIG. 6(C) are graphs illustrating a current phase angle, a waveform of a resultant current, and a rotor phase angular velocity.

FIG. 6(A), FIG. 6(B), and FIG. 6(C) are graphs illustrating a current phase angle, a waveform of a resultant current, and a rotor phase angular velocity.

FIG. 6(A) illustrates a current phase angle $\alpha_1*$ and a current phase angle final value $\alpha*$ obtained by applying the change map 16 to the application map 17. As illustrated in the graph of the current phase angle final value $\alpha*$ indicated by a solid line, the current phase angle is shifted from the current phase angle $\alpha_1*$ indicated by a broken line such that the current phase angle is advanced or delayed.

FIG. 6(B) illustrates a resultant current waveform $I_1m$ in a case where the change map 16 is not applied and a resultant current waveform Im in a case where the change map 16 is applied to the application map 17. Although the cycle of the resultant current waveform $I_1m$ is regular, the cycle of the resultant current waveform Im is irregular. This resultant current waveform Im is similar to a torque applied to the motor 300, and shifts the cycle at which the pulsation of the torque is generated.

FIG. 6(C) illustrates a rotor phase angular velocity $\omega e_1$ in a case where the change map 16 is not applied, and the rotor phase angular velocity $\omega e$ in a case where the change map 16 is applied to the application map 17. The rotor phase angular velocity $\omega e_1$ is constant in synchronization with a rotational speed of the motor 300. However, the rotor phase angular velocity ωe temporarily becomes asynchronous with the rotational speed of the motor 300.

Figure 7:
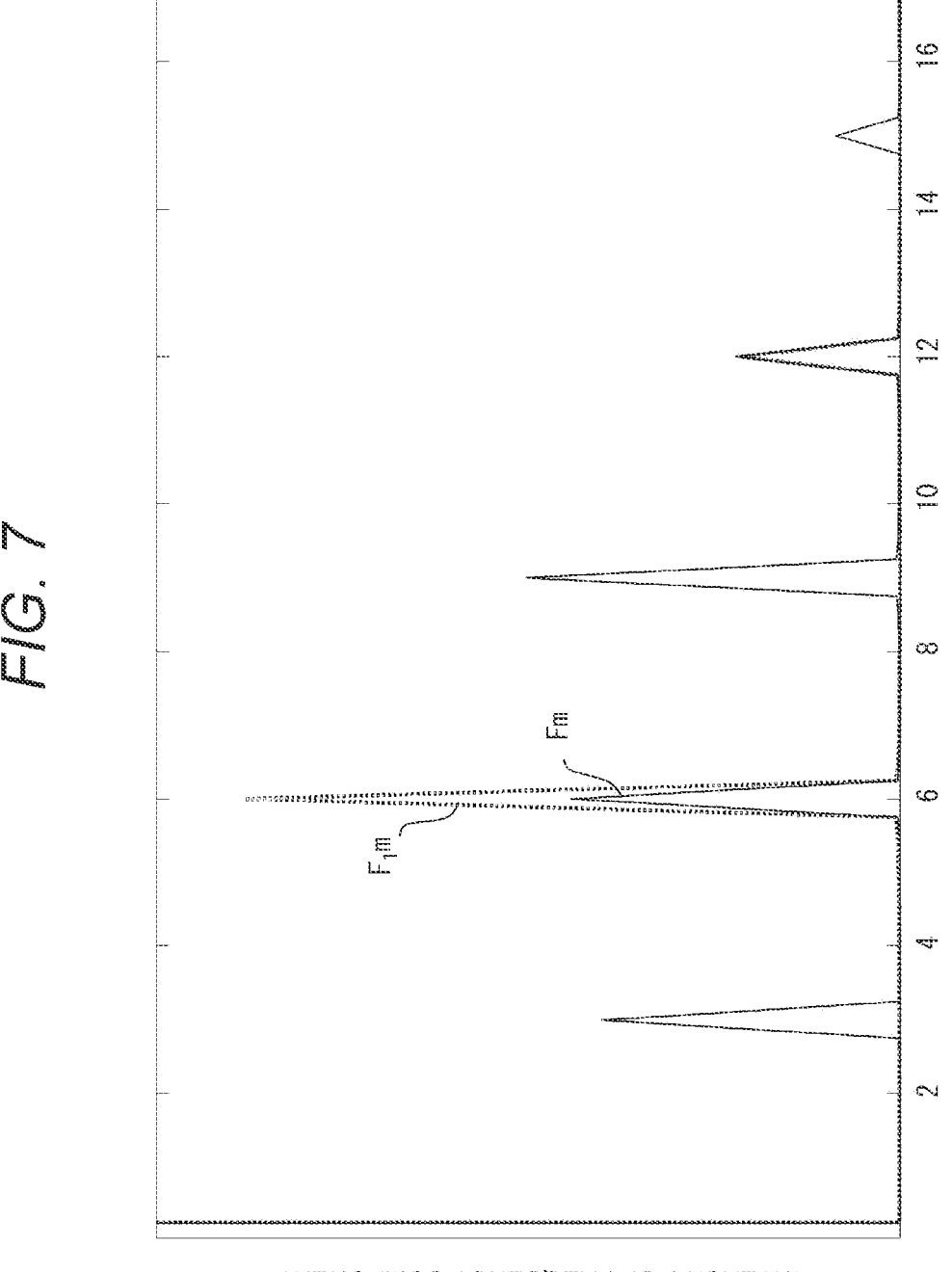
FIG. 7 is a graph illustrating an analysis result of frequency components of a torque of a motor.

FIG. 7 is a graph illustrating an analysis result of frequency components of a torque of the motor 300. Frequency is taken on an axis of abscissas, and the intensity of the frequency component is taken on an axis of ordinate.

FIG. 7 illustrates a frequency component $F_1m$ in a case where the change map 16 is not applied, and a frequency component Fm in a case where the change map 16 is applied to the application map 17. In a case where the motor 300 is driven at a low speed and with a high torque or the like, the pulsation of a torque of an electrical angle sixth-order component at the frequency component $F_1m$ is increased. When the present embodiment is applied, the pulsation of the torque of the electrical angle sixth-order component can be suppressed as indicated by the frequency component Fm without changing a torque command τ*.

According to the embodiments described heretofore, the following manners of operation and advantageous effects can be obtained.

(1) The motor control device 100 includes: an inverter 101 that supplies an alternating current to the motor 300 mounted on the vehicle; the current detection unit 103 that detects the alternating current; the position detection unit 104 that detects a rotor phase angle of the motor 300; and the inverter control unit 105 that controls the inverter 101 based on a current value detected by the current detection unit 103 and the rotor phase angle detected by the position detection unit 104, wherein the inverter control unit 105, in response to a timing at which vibration of the vehicle is generated, changes a current phase angle of the motor 300, and makes a cycle of a waveform of a resultant current of the alternating current irregular. As a result, by performing a motor control in response to timing at which the vibration of the vehicle is generated, the influence on the vibration of the vehicle can be reduced.

(2) The motor control method is a motor control method used by the motor control device 100 including: the inverter 101 that supplies an alternating current to the motor 300 mounted on the vehicle; the current detection unit 103 that detects the alternating current; the position detection unit 104 that detects a rotor phase angle of the motor 300; and the inverter control unit 105 that controls the inverter 101 based on a current value detected by the current detection unit 103 and the rotor phase angle detected by the position detection unit 104, the motor control method including, in response to a timing at which vibration of the vehicle is generated, changing a current phase angle of the motor 300, and making a cycle of a waveform of a resultant current of the alternating current irregular. As a result, by performing a motor control in response to timing at which the vibration of the vehicle is generated, the influence on the vibration of the vehicle can be reduced.

Modifications

The present invention can be implemented by modifying the above-described embodiment as follows.

(1) The case where the motor 300 is a three-phase motor and an alternating current is a three-phase alternating current has been described as an example. However, the motor 300 is not limited to such a motor, and may be a multiple-phase motor.

(2) The case where the present invention is used for driving the motor 300 mounted on the vehicle has been described as an example. However, the present invention is applicable at the time of regenerating the motor 300.

The present invention is not limited to the above-described embodiments, and other configurations conceivable within the scope of the technical concept of the present invention are also embraced within the scope of the present invention provided that the technical features of the present invention are not impaired. Further, the present invention also embraces the combinations of the above-described embodiment and a plurality of modifications.

REFERENCE SIGNS LIST

10 current conversion unit
11 d-axis conversion unit
12 q-axis conversion unit
13 angular velocity arithmetic operation unit
14 dq coordinate conversion unit
15 UVW coordinate conversion unit
16 change map
17 application map
18 multiplier
19 adder
100 motor control device
101 inverter
102 gate drive circuit
103 current detection unit
104 position detection unit
105 inverter control unit
200 secondary battery
201 contactor
202 smoothing capacitor
300 motor
400 vehicle control unit

The invention claimed is:

1. A motor control device comprising:
an inverter that supplies an alternating current to a motor mounted on a vehicle;
a current detection unit that detects the alternating current;
a position detection unit that detects a rotor phase angle of the motor; and
an inverter control unit that controls the inverter based on a current value detected by the current detection unit and the rotor phase angle detected by the position detection unit,
wherein the inverter control unit, in response to a timing at which vibration of the vehicle is generated, changes a current phase angle of the motor, and makes a cycle of a waveform of a resultant current of the alternating current irregular, and
wherein the inverter control unit determines the timing at which the vibration of the vehicle is generated, based on a rotor phase angular velocity of the motor.

2. The motor control device according to claim 1, wherein the motor is a three-phase motor, and
the alternating current is a three-phase alternating current.

3. The motor control device according to claim 1, wherein the inverter control unit changes the current phase angle by advancing or delaying the current phase angle in a current control cycle of the alternating current.

4. The motor control device according to claim 3, wherein the inverter control unit generates a current command value that is equivalent to a torque of the motor before the current phase angle is changed even if the current phase angle is changed.

5. The motor control device according to claim 3, wherein the inverter control unit obtains a change value of the current phase angle corresponding to the current phase angle and the rotor phase angle.

6. The motor control device according to claim 5, wherein the inverter control unit maximizes a change in the current phase angle near a zero cross of the alternating current.

7. The motor control device according to claim 1, wherein the inverter control unit determines timing at which the vibration of the vehicle is generated based on a rotational speed of the motor or a torque of the motor.

8. The motor control device according to claim 1, wherein the inverter control unit determines timing at which the vibration of the vehicle is generated based on a driving scene of the vehicle.

9. A motor control method used by a motor control device including: an inverter that supplies an alternating current to a motor mounted on a vehicle; a current detection unit that detects the alternating current; a position detection unit that detects a rotor phase angle of the motor; and an inverter control unit that controls the inverter based on a current value detected by the current detection unit and the rotor phase angle detected by the position detection unit, the motor control method comprising:

determining a timing at which vibration of the vehicle is generated, based on a rotor phase angular velocity of the motor, and in response to the timing at which the vibration of the vehicle is generated, changing a current phase angle of the motor, and making a cycle of a waveform of a resultant current of the alternating current irregular.

\*  \*  \*  \*  \*